United States Patent Office.

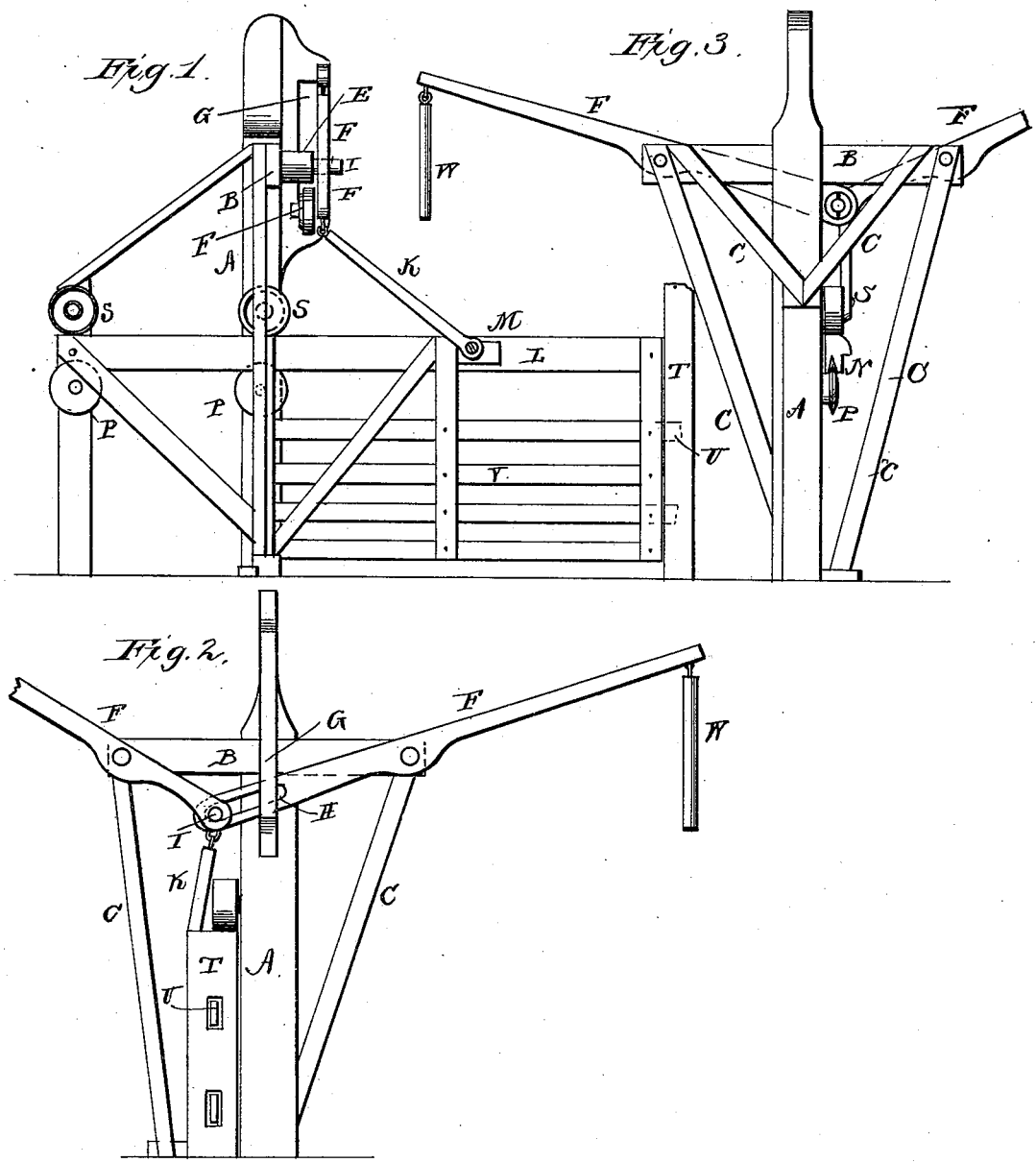

CHARLES FISHER AND FRANK H. PITCHER, OF LENA, ILLINOIS.

GATE.

SPECIFICATION forming part of Letters Patent No. 243,877, dated July 5, 1881.

Application filed April 16, 1881. (No model.)

*To all whom it may concern:*

Be it known that we, CHARLES FISHER and FRANK H. PITCHER, of Lena, in the county of Stephenson, and in the State of Illinois, have invented certain new and useful Improvements in Gates; and we do hereby declare that the following is a full, clear, and exact description thereof, reference being had to the accompanying drawings, and to the letters of reference marked thereon, making a part of this specification.

This invention relates to certain improvements in sliding gates, and it has for its objects to provide a gate which will be cheap and durable in construction and effective in operation, and which can be readily operated from either side by a person on horseback or in a vehicle. These objects we attain by the apparatus and mechanism illustrated in the accompanying drawings, in which—

Figure 1 represents a side elevation of our improved gate. Fig. 2 represents front view, and Fig. 3 a rear view, of our apparatus.

The letter A indicates the main support or standard of the gate, which extends above the same, and at its upper part is provided with a transverse arm, B, which is strengthened by braces C, extending from the lower part of the standard A to the top of the rear support or standard, D. To the extremities of this arm are attached the offsets E, to which the levers F are pivoted or fulcrumed. One of these levers extends through a slotted guide, G, and is slotted, as indicated by the letter H, the other lever being provided with a pin, I, extending through the slot H, connecting the two levers together, so that they will operate simultaneously. To one of the levers is loosely attached one end of a link, K, the other end of which is pivoted to the gate L at M. The top rail of the gate is longitudinally grooved on its under side, as indicated by the letter N, Fig. 3, and is mounted on rollers P, journaled on the main and rear standards. The said top rail is extended backward, so as to give the gate the proper travel, and is braced to the lower rear edge of the gate, as indicated by the letter R. The top rail is held down upon the rollers P by the rollers S, which are likewise journaled to the rear and main standards.

The letter T represents the forward standard, which is provided with mortises U for the reception of the projecting ends of the rails V, to support the forward end of the gate when it is closed. The free ends of the levers are provided with loose handles W, by which they may be operated to slide the gate, which is accomplished by giving the handle a sharp pull, which starts the gate, the momentum carrying it, after the link has arrived at a vertical position, to the front or rear, as the gate is opened or closed.

Having thus described our invention, what we claim, and desire to secure by Letters Patent, is—

In combination with the sliding gate mounted on knife-edged disks journaled on the main and rear standards, the operating-levers fulcrumed to a cross-bar on the main standard, one of said levers being slotted and the other having a friction-roller resting in said slot, the link connecting the levers with the gate, and the guide forming part of or secured to the main standard, all arranged to operate substantially in the manner specified.

In testimony that we claim the foregoing we have hereunto set our hands this 17th day of March, 1881.

CHARLES FISHER.
F. H. PITCHER.

Witnesses:
JACOB GABLE,
S. E. ANDREWS.